United States Patent
Le Van Suu (10) Patent No.: US 7,061,985 B2
(45) Date of Patent: Jun. 13, 2006

(54) UNIVERSAL MODULATOR/DEMODULATOR

(75) Inventor: Maurice Le Van Suu, Savigny le Temple (FR)

(73) Assignee: STMicroelectronics SA, Montrouge (FR)

( * ) Notice: Subject to any disclaimer, the term of this patent is extended or adjusted under 35 U.S.C. 154(b) by 847 days.

(21) Appl. No.: 10/045,956

(22) Filed: Oct. 26, 2001

(65) Prior Publication Data
US 2002/0101916 A1  Aug. 1, 2002

(30) Foreign Application Priority Data
Oct. 26, 2000 (FR) .................... 00 13748

(51) Int. Cl.
- H04L 27/00 (2006.01)
- H04L 9/00 (2006.01)
- H03H 7/30 (2006.01)
- H04B 7/00 (2006.01)

(52) U.S. Cl. .......... 375/259; 375/233; 455/66; 380/266

(58) Field of Classification Search ........ 375/233, 375/259, 223; 340/310, 541, 572; 209/220–250
See application file for complete search history.

(56) References Cited

U.S. PATENT DOCUMENTS

| | | | |
|---|---|---|---|
| 4,517,519 A | 5/1985 | Mukaiyama | 329/126 |
| 4,763,357 A * | 8/1988 | Barr | 380/266 |
| 4,799,214 A * | 1/1989 | Kaku | 370/291 |
| 4,813,058 A | 3/1989 | Takase | 375/82 |
| 5,642,380 A * | 6/1997 | Lambert | 375/223 |
| 5,940,438 A | 8/1999 | Poon et al. | 375/222 |
| 6,535,739 B1 * | 3/2003 | Chen et al. | 455/437 |
| 2005/0035850 A1 * | 2/2005 | Schwager et al. | 340/310.01 |

FOREIGN PATENT DOCUMENTS

EP   0940956   9/1999

\* cited by examiner

Primary Examiner—Stephen Chin
Assistant Examiner—Cicely Ware
(74) Attorney, Agent, or Firm—Lisa K. Jorgenson; Allen, Dyer, Doppelt, Milbrath & Gilchrist, P.A.

(57) ABSTRACT

A modulation/demodulation device capable of operating with several types of modulation using different carrier frequencies may include a modulator which modulates at least one signal by a signal of a predetermined duration and representative of a binary information supplied by a microprocessor. The device may also include a demodulator which demodulates the modulated signals arriving from a remote site. This may be done by determining the type of modulation of the received signals and their carrier frequency (or frequencies), supplying signals from an analysis of the signals received according to the determined type of modulation, and detecting the signals of determined duration representative of binary information to make them accessible to the microprocessor.

35 Claims, 6 Drawing Sheets

UNIVERSAL MODULATOR/DEMODULATOR

FIELD OF THE INVENTION

The present invention relates to the field of electronic circuits and, more particularly, to modulation/demodulation devices for modulating a high-frequency electrical signal. Such devices may be for sending information via modulated electronic signals to a remote device and demodulating the modulated electrical signals to extract the information therefrom. More specifically, the present invention relates to modulation/demodulation devices which are used in the field of home automation, or in the area of energy metering for remotely metering electricity meters, modifying electricity billing rates, commanding the on/off switching of household appliances, etc.

BACKGROUND OF THE INVENTION

There are many high frequency electrical signal modulation techniques used in the field of home automation and energy metering, such as amplitude modulation (AM), spread frequency shift keying (SFSK), and frequency shift keying (FSK). Information may be encoded according to different protocols which determine the format of the messages to be sent, where each message includes binary signals which control the modulator at the sending end. Upon reception, the demodulator detects the high frequency modulated signals and extracts the binary information of the message sent. The extracted binary signals are then interpreted by an appropriate device, such as a microprocessor, depending on the protocol.

Because the appliances of a home automation system may receive and send messages, they are generally equipped with a modulation/demodulation device. Yet, appliances of a home automation system are typically adapted to operate according to one type of modulation. As a result, they cannot be used in another home automation system that implements another type of modulation.

SUMMARY OF THE INVENTION

In view of the foregoing, an object of the invention is to provide a modulation/demodulation device which can function with different types of modulation.

This and other objects, features, and advantages in accordance with the present invention are provided by a modulation/demodulation device capable of operating according to a plurality of types of modulation using different carrier frequencies. The modulation/demodulation device may include a modulator for modulating, according to the type of modulation, at least one signal at a carrier frequency by a signal of a determined duration and representative of binary information supplied by a microprocessor. The modulated signal may be applied to a sending/receiving device for sending to a remote site.

A demodulator may also be included for receiving modulated signals from a remote site via the sending/receiving device and demodulating the modulated signals. More specifically, the demodulating may be done by determining the type of modulation used for the received signals and their carrier frequency/frequencies, supplying signals from an analysis of the signals received according to the determined type of modulation, and detecting the signals of determined duration representative of binary information to make them accessible by the microprocessor.

BRIEF DESCRIPTION OF THE DRAWINGS

Other advantages and characteristics of the present invention will become more apparent from the following description of the preferred embodiments in conjunction with the appended drawings, in which.

DETAILED DESCRIPTION OF THE PREFERRED EMBODIMENTS

The invention will be described herein within the context of an application with existing types of modulation and protocols. By way of example, these may include: EURIDIS, operating in amplitude modulation with a 50 kHz carrier frequency (MA mode or signal); Power Line Area Network (P.LAN), operating in frequency modulation between 60 kHz and 90 kHz in the field of meter reading (MB mode or signal); European Home System (EHS), operating in frequency modulation between 60 kHz and 90 kHz in the field of meter reading (MB mode or signal); EHS, analogous to the above, but operating at 132.5 kHz in the field of automatic controls in domestic automation (MC mode or signal); and Ripple Remote Control (RRC), operating in amplitude modulation at a 175 kHz carrier frequency (MD mode or signal). Of course, the invention is also applicable to other modulation modes, such as amplitude modulation, frequency modulation, frequency multiplex modulation, and frequency hopping in the field of data encryption (secured transmission).

Figure 1:
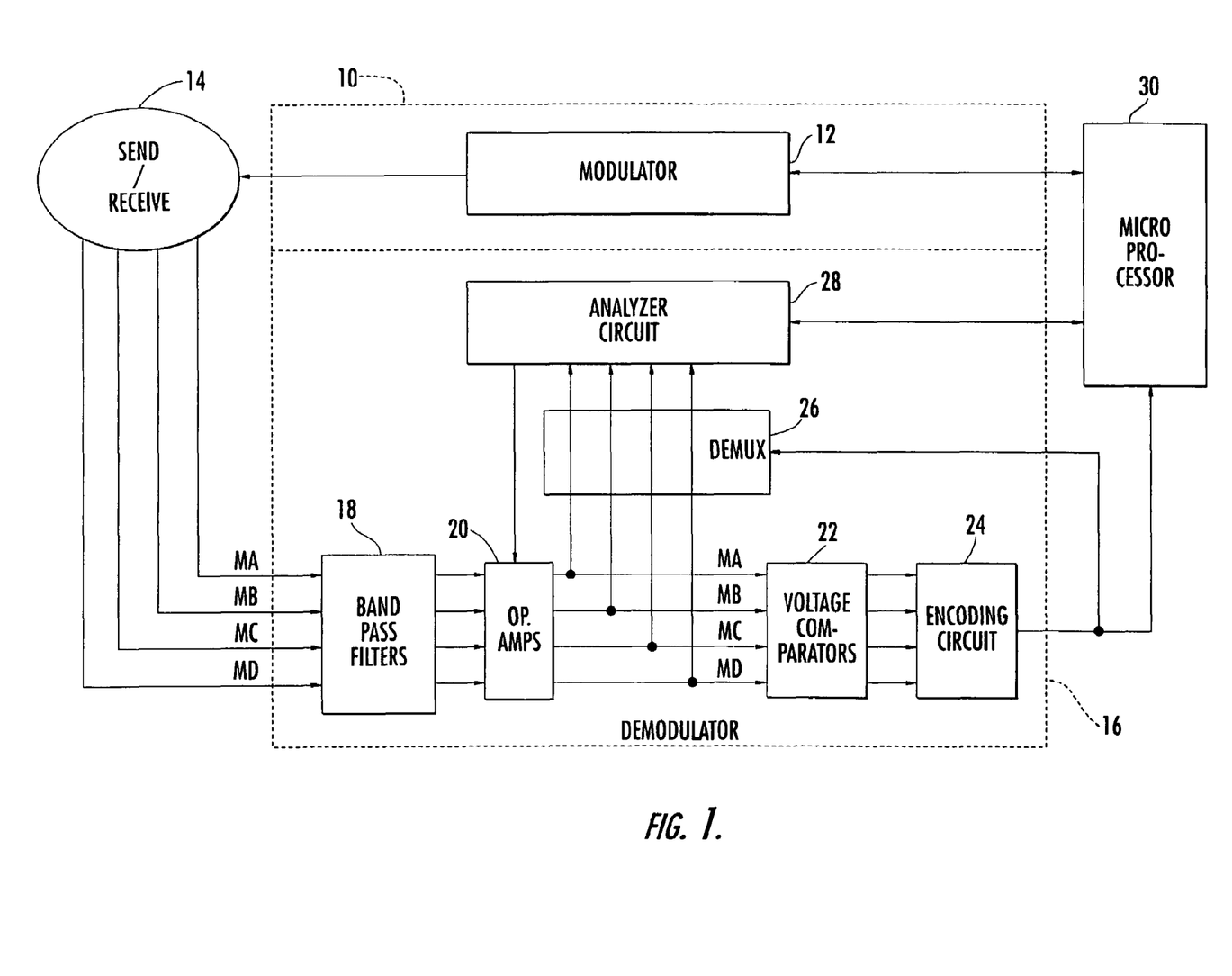
FIG. 1 is a schematic block diagram of a modulation/demodulation device in accordance with the invention that is connected at one end to a message encoding/decoding microprocessor and at the other end to a modulated electrical signal sending/receiving device.

The modulation/demodulation device 10, or more succinctly modulator/demodulator 10, illustratively includes a modulator 12 which modulates a signal at a carrier frequency using a modulation mode chosen to produce modulated signals. These modulated signals are applied to a sending/receiving device 14 by which they are sent to a remote site. Further, a demodulator 16 receives the modulated signals from the remote site via the sending/receiving device 14.

The demodulator 16 essentially includes a set of bandpass filters 18, each centered on the carrier frequencies of the modulated signals, and to which are applied the signals received and detected by the sending/receiving device 14. The demodulator 16 also illustratively includes a set of operational amplifiers 20, one per bandpass filter. Each operational amplifier is gain controlled by a gain control circuit. Additionally, the demodulator 16 illustratively includes a set of voltage comparators 22, one per bandpass filter, to detect the modulated signals which are outside a determined threshold (FIG. 4), and an encoding circuit 24 whose output code identifies the received signal MA, MB, MC or MD. The demodulator 16 also includes a demultiplexing circuit 26 for acting on the received signals and selecting the signal that is to be demodulated among the received signals MA, MB, MC or MD, and an analyzer circuit 28 acting on the selected signal MA, MB, MC or MD to extract the data contained in the modulated signal.

In a sending mode, the data to be sent are supplied to a modulator 12 by a microprocessor 30, which also indicates the type of modulation that will apply. In a receiving mode, the data extracted from the received modulated signal are supplied to the microprocessor 30, and the signal is decoded as a function of the received signal MA, MB, MC or MD and the sending protocol.

The microprocessor 30 provides all the circuits of the modulator/demodulator according to the invention with a clock signal CLK, e.g., pulses at 8 MHz frequency. This clock signal CLK is used by the modulator 12 to produce the modulated signals, and it is also used by the demodulator's analyzer circuit 28 to extract the data in the modulated signals.

The modulator 12 (FIG. 2) generates a sinusoidal signal corresponding to each carrier frequency. The duration of the signals at each carrier frequency are determined by the number of sinusoids at the carrier frequency. To generate this sinusoidal signal at the carrier frequency, the modulator uses a memory 40 which stores the codes representative of the values of the samples of a sinusoidal signal. It is the readout speed of this memory 40 that determines the frequency of sinusoidal signal that will be obtained. The number of samples per sinusoid is equal to R.

To this end, in the FSK mode at a speed of 1200 baud, a binary digit 1 is, for example, represented by a signal at a frequency F1=71.4 kHz, while a binary digit 0 is represented by a signal at a frequency F=72.6 kHz with a central frequency of 72 kHz and a mean period of 13.88 microseconds. Also, a speed of 1200 baud corresponds to a period of 833 microseconds, i.e., around 60 periods at the 72 kHz frequency. In the case where a bit occupies half the period at most, its maximum duration will be 30 periods of the 72 kHz signal.

Figure 2:
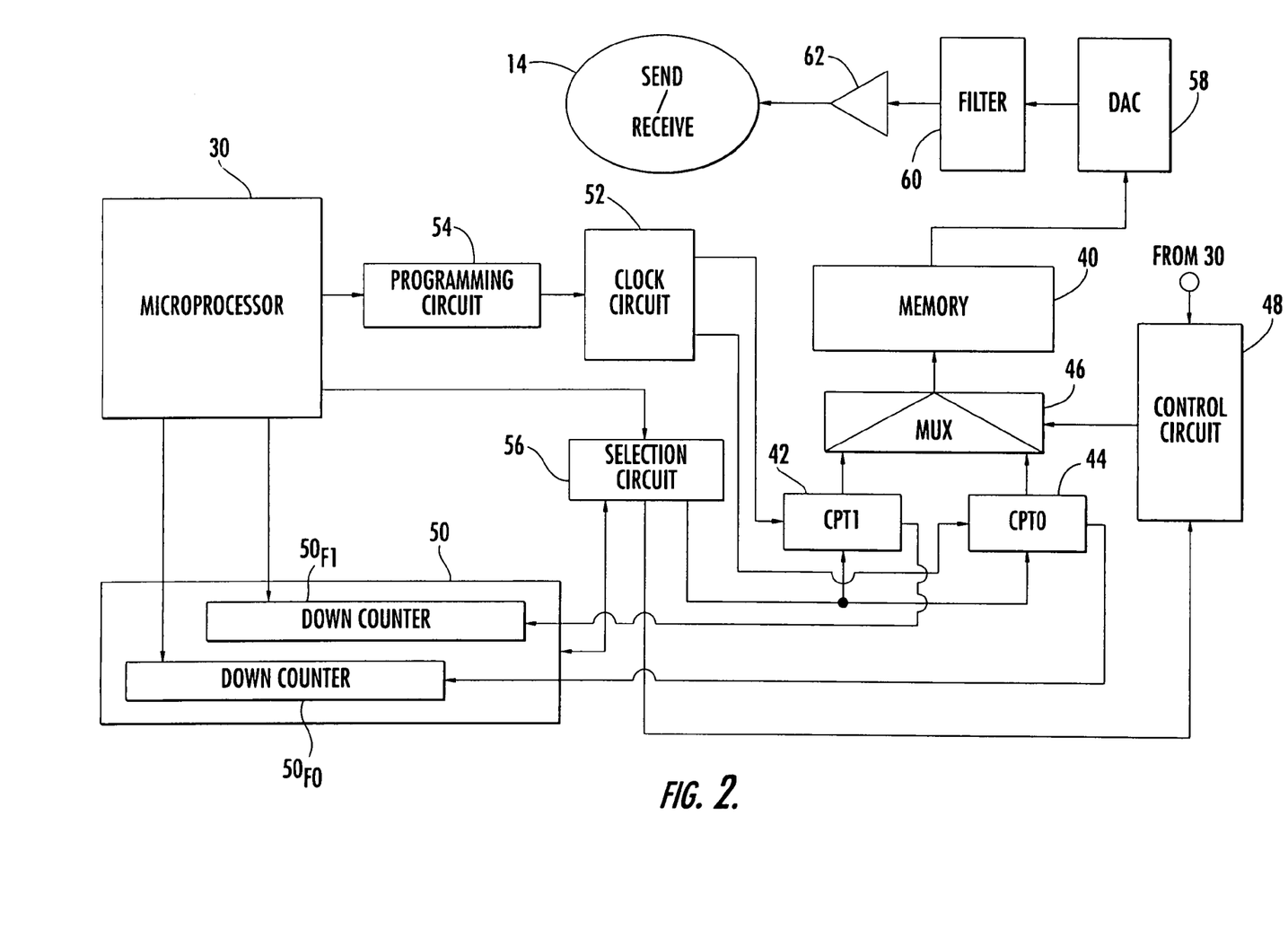
FIG. 2 is a more detailed schematic block diagram of the modulator of the modulation/demodulation device of FIG. 1.

The modulator 12 in accordance with the invention illustratively includes the memory 40, which is of the read-only (ROM) type. The number of samples per sinusoid may be 25, for example, with a readout frequency of 1.815 MHz for the frequency F0=72.6 kHz. Further, the modulator 12 also includes two counters 42 (or CPT1) and 44 (or CPT0) which scan the addresses of the memory 40 to read the codes representative of the samples of each sinusoid. A multiplexing circuit 46 selects either the addresses supplied by the counter CPT1, or those supplied by the counter CPT0, and a control circuit 48 operates on the multiplexing circuit as a function of a binary digit 1 or 0 to be sent.

Additionally, a counter circuit 50 totals the number N of pulses at frequency F1 and the number M of pulses at the frequency F0. This count is in fact carried out by a countdown using two countdown counters, one $50_{F1}$ for the number N and the other $50_{F0}$ for the number M, the numbers N and M being loaded by the microprocessor 30. The modulator 12 also illustratively includes a clock circuit 52 which supplies the counting pulses of counters 42 and 44 to obtain the frequencies F1 or F0, i.e., the rate of reading the code representative of the samples, and a programming circuit 54 for the clock circuit 52, which is loaded by the microprocessor 30 as a function of frequencies F1 and F0. The modulator 12 may further include a selection circuit 56 which selects the type of modulation (e.g., AM, FSK or SFSK) a digital-to-analog converter 58 for converting the codes supplied by the memory 40, a bandpass filter 60 for eliminating the signals at unwanted frequencies, and an operational amplifier 62 for amplifying the modulated signals and applying them to the sending/receiving device 14.

The operation of the modulator illustrated in FIG. 2 is then as follows. For a given type of modulated signal to be obtained, the microprocessor 30 loads the programming circuit 54, the countdown counters $50_{F1}$ and $50_{F0}$, and the modulation selection circuit 56 with the numbers N and M. The clock circuit 52 supplies the counting pulses of counters the CPT1 and CPT0 to obtain the high-frequency sinusoidal signals F1 and F0. The choice between the addresses supplied by counter CPT1 or by counter CPT0 is made by the multiplexing circuit 46 as a function of the binary digit to be sent, which is supplied by the control circuit 48.

The number N of sinusoids at frequency F1 for a binary digit 1 is counted down by the countdown counter $50_{F1}$, while the number M of sinusoids at frequency F0 for a binary digit 0 is counted down by the countdown counter $50_{F0}$. Each countdown counter is decremented by 1 every time the corresponding counter CPT1 or CPT0 has gone through a complete cycle. As already explained with reference to FIG. 1, the signals supplied by the receiver of the sending/receiving device 14 are applied to a set of bandpass filters 18. Each of the bandpass filters 18 filters a given frequency band which corresponds to that of the modulated signal that may hypothetically be received.

Figure 3:
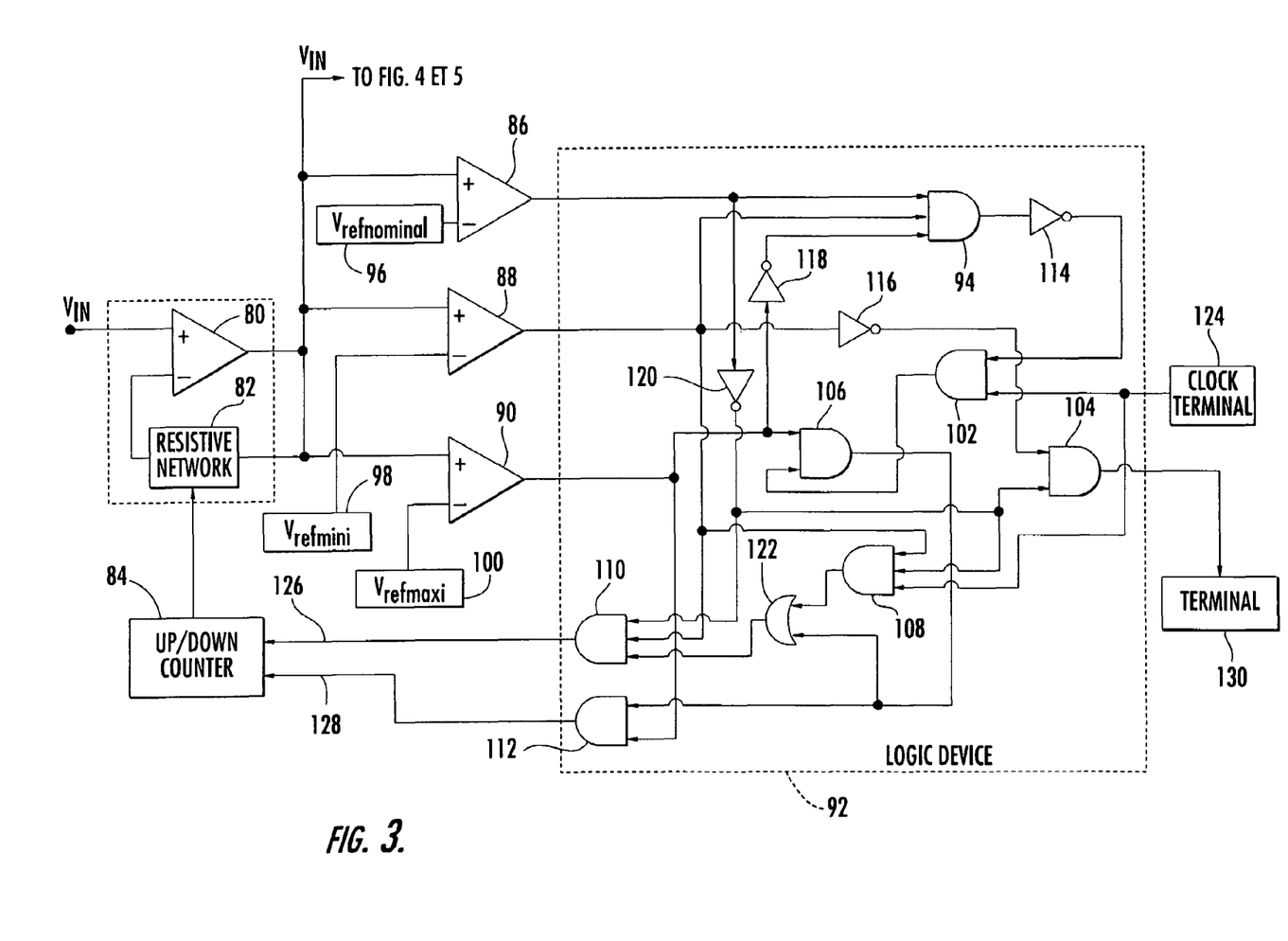
FIG. 3 is a more detailed schematic block diagram of a first part of the demodulator of FIG. 1.

Each outgoing signal Vin from a bandpass filter of the set 18 is applied to an operational amplifier 80 whose gain is controlled by a resistive network 82 formed by switchable resistors to modify the feedback, and hence the gain, of the operational amplifier 80. The resistors of the network are switched by an up/down counter 84 whose current value varies as a function of the amplitude of the signal VIN relative to three reference thresholds, namely Vrefnominal, Vrefmaxi and Vrefmini. To this end, the output terminal of the operational amplifier 80, which supplies an amplified signal VIN, is connected to one of two input terminals of three comparators 86, 88 and 90. The other input terminal is connected to voltage sources 96, 98 and 100 which respectively supply the reference threshold values Vrefnominal, Vrefmini and Vrefmaxi.

The output terminals of comparators 86, 88 and 90 are connected to a logic device 92 which performs several functions. One of these functions is decreasing the value of the up/down counter 84 when VIN is greater than Vrefmaxi to reduce the gain. Further, the logic device 92 increases the value of the up/down counter 84 when VIN is greater than Vrefmini but less than Vrefnominal to increase the gain. Another function of the logic device 92 is not to change the value of the up/down counter when VIN is greater than Vrefnominal but less than Vrefmax, and thus not to modify the gain.

The logic device 92 includes AND gates 94, 102 to 112, inverters 114 to 120, and an OR gate 122. The AND gate 94 includes three input terminals which are connected respectively to the output terminal of comparator 86, the output terminal of comparator 88, and the output terminal of comparator 90 via the inverter 118. The output terminal of the AND gate 94 is connected to one of two input terminals of the AND gate 102 via the inverter 114. The other input terminal of the AND gate 102 is connected to a terminal 124 which supplies a clock signal at a suitable frequency.

The output terminal of the AND gate 102 is connected to one of two input terminals of the AND gate 106, the other input terminal of which is connected to the output terminal of comparator 90. This output terminal of the comparator 90 is also connected to one of two input terminals of the AND gate 112, the other input terminal of which is connected both to the output terminal of the AND gate 106 and to one of two input terminals of the OR gate 122. The other input terminal of the OR gate 122 is connected to the output terminal of the AND gate 108.

The AND gate 108 has three input terminals which are connected respectively to the clock terminal 124, the output terminal of comparator 88, and the output terminal of comparator 86 via the inverter 120. The output terminal of the inverter 120 is also connected to one of three input terminals of the AND gate 110, and to one of two input terminals of the AND gate 104. The output terminal of the AND gate 110 is connected to the count input terminal 126 of the up/down counter 84, while the output terminal of the AND gate 112 is connected to the count-down input 128 of the up/down counter 84. The second input terminal of the AND gate 104 is connected to the output terminal of the comparator 88 via an inverter 116, and the output terminal is connected to a terminal 130 indicating that the received signal has an amplitude VIN which is less than Vrefmini.

The operation of the device illustrated in FIG. 3 is as follows. For the case where VIN is greater than Vrefnominal and Vrefmini but less than Vrefmaxi, the output terminals of comparators 86, 88 and 90 are respectively at logic states 1, 1 and 0. Also, by logic combinations, AND gates 110 and 112 are blocked so that the up/down counter 84 does not change its count value.

For the case where VIN is less than Vrefnominal but greater than Vrefmini, the output terminals of comparators 86, 88 and 90 are respectively at logic states 0, 1 and 0. Further, by logic combinations, AND gate 110 is open and allows the clock pulses supplied by terminal 124 to pass through. These pulses are then applied to the count input 126 of the up/down counter 84 whose value increments and causes a gain increase in amplifier 80 via the resistor network 82.

For the case where VIN is greater than Vrefnominal, Vrefmini, and Vrefmaxi, the output terminals of comparators 86, 88 and 90 are all at a logic state 1 and, by logic combination, the AND gate 112 is open to allow the clock pulses supplied by clock terminal 124 to pass through. These pulses are applied to the countdown input 128 of the up/down counter 84 whose value decrements and causes a gain reduction in amplifier 80 via the resistor network 82.

For the case where VIN is less than Vrefnominal, Vrefmini, and Vrefmaxi, the output terminals of comparators 86, 88 and 90 are all at a logic state 0 and, by logic combination, the output terminal of the AND gate 104 is at logic state 1. Thus, a signal is produced on the output terminal 130 which is interpreted as a received signal that is not correct.

Figure 4:
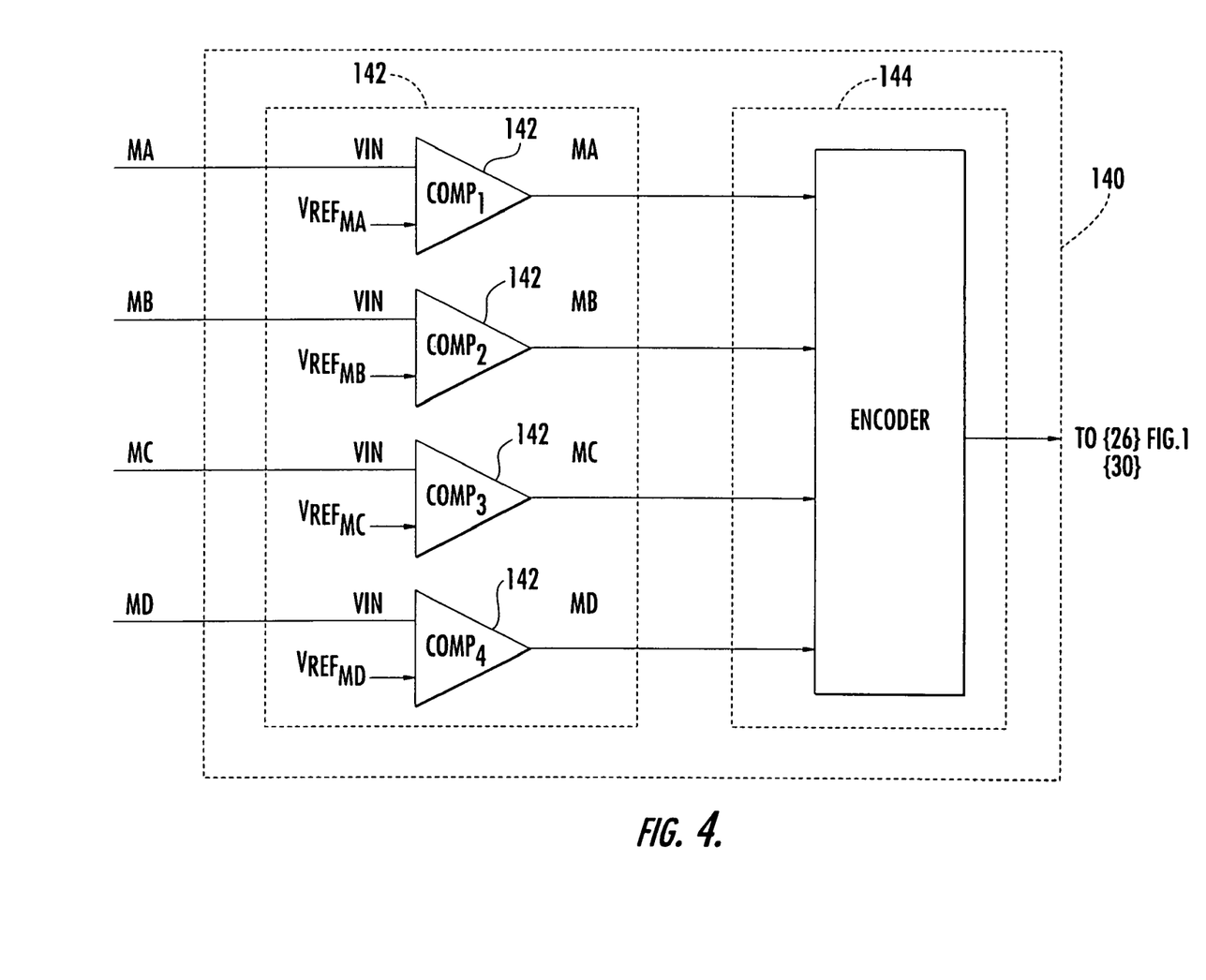
FIG. 4 is a diagram of a received signal selection device according to the invention.

The signal VIN of each receiving channel MA, MB, MC and MD is filtered (18), amplified (20), and then applied to a demultiplexing circuit 26 and a received channel detector circuit 140 whose output signal controls the multiplexing circuit 26. The detector circuit 140 includes four comparators $142_{MA}$, $142_{MB}$, $142_{MC}$ and $142_{MD}$, and an encoding circuit 144 for encoding output logic states of the comparators 142. In each comparator, the signal VIN corresponding to the signal received on the channel is compared to a threshold VrefMA, VrefMB, VrefMC and VrefMD.

If one of the signals VIN exceeds the threshold, the output terminal of the corresponding comparator passes to a logic state 1, whereas the output terminals of the other comparators remain at a logic state 0. These logic states 1 and 0 are encoded in the encoding circuit 144 which supplies a two-digit code applied to the demultiplexing circuit 26 to select the channel having produced a logic state 1 at the output of one of the comparators 142. This code is also applied to the microprocessor 30 to indicate to the latter the identity MA, MB, MC or MD of the received channel.

Figure 5:
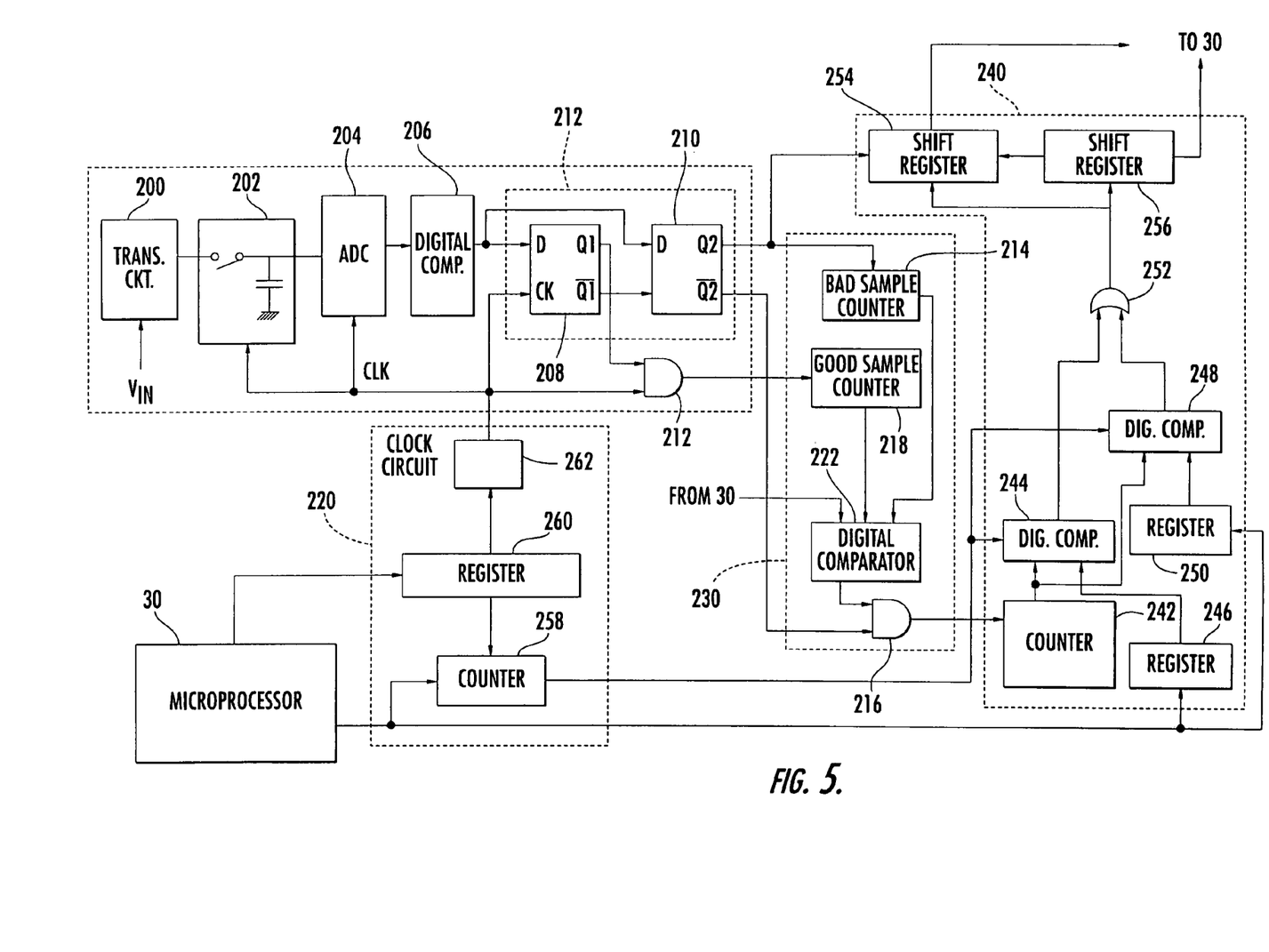
FIG. 5 is a schematic block diagram of the signal analyzing circuit of FIG. 1.

A diagram illustrating in greater detail the analyzer circuit 28 of FIG. 1 may be seen in FIG. 5. The analyzer circuit 28 receives, via the demultiplexing circuit 26, the output signal VIN from one of the operational amplifiers 20. The amplifier input signal is designated Vin. The demodulation circuit 28 is based on the measurement of the number N or M of sinusoids of the carrier frequency F1 or F0 in the binary digit or bit 1 or 0. The numbers N and M are given by the microprocessor 30, the latter knowing the channel MA, MB, MC or MD currently received. It also indicates the value of the frequency of the clock signals to be used.

As shown in FIG. 5, the demodulator circuit includes a clock circuit 220 which supplies a pulse signal whose frequency is determined as a function of the channel MA, MB, MC or MD being received. This clock circuit includes a program register 260 which is loaded by the microprocessor 30 and produces the different clock signals. For example, these clock signals may be provided to a circuit 262 to obtain the sampling CLK signal and to a counter 258 which is loaded by the microprocessor 30 with the number of bits of the frame to be received. A translator circuit 200 translates the signal VIN so that it evolves on either side of the zero value, and a sample-and-hold circuit 202 samples the signal VIN. The sample-and-hold circuit 202 is controlled by the clock signal CLK supplied by circuit 220.

Furthermore, an analog-to-digital converter 204 encodes the samples supplied by the sample-and-hold circuit 202, and a digital comparator 206 compares, sample code by sample code, the code representative of the amplitude to a code representing a reference voltage Vrefn. A zero crossing detector 212 is also included for the signal VIN and includes two flip-flops 208 and 210. These allow the detection of the half-period and period of the signal at the carrier frequency F1 and/or F0. A validation circuit 230 is for validating the period of the sinusoid of the signal at the carrier frequency by counting the number of samples, and a detector circuit 240 detects logic state 1 or 0 bits by counting the number N or M of sinusoids.

The zero crossing detector 212 includes two D-type latches 208 and 210. The D input terminal of the latch 208 is connected to the output terminal of the digital comparator 206 and to the D input terminal of the latch 210. The clock input of the latch 208 receives the clock signal corresponding to the sampling frequency such that it changes state at the leading edge of that pulse if the D input terminal changes state. The Q1 output terminal of the latch 208 is connected to one of two input terminals of an AND gate 212, the other input terminal of which receives the sampling clock signal CLK. The other output terminal $\overline{Q1}$ of the latch 208 is connected to the clock input terminal of the latch 210. The output terminal Q2 of the latch 210 is connected to an input terminal of a counter 214 which counts the samples designated as "bad", i.e., those which do not correspond to a half sinusoid of the carrier frequency signal.

The second output terminal $\overline{Q2}$ which corresponds to a period of the carrier signal designated as "good," is connected to one of two input terminals of an AND gate 216 of the validation circuit 230. The validation circuit 230 includes a "bad" sample counter 214, and a "good" sample counter 218 whose input terminal is connected to the output terminal of AND gate 212. Further, a digital comparator 222 effects a comparison between the contents of the counter 218 and the number N of samples expected per sinusoid of the signal at the carrier frequency. Again, the number N is supplied by the microprocessor 30. Additionally, the AND gate 216 receives at its second input terminal the signal at logic state 1 resulting from a positive (matching) comparison. It produces at its output terminal a validation signal validating the period of the signal at the received carrier frequency that is applied to the detector circuit 240.

The detector circuit 240 includes a counter 242 for the number P of periods of the carrier signal, whether that number corresponds to a logic state 1 bit or a logic state 0 bit. Also, a first digital comparator 244 compares the number P to the number N of periods corresponding to the channel being received for a logic state 1 bit, where number N is given by the microprocessor 30 and recorded in a register 246. A second digital comparator 248 compares the number P to the number M of periods corresponding to the channel being received for a bit at logic state 0, this number M being given by the microprocessor 30 and recorded in a register 250.

Furthermore, an OR gate 252 is included and one of its two input terminals receives the logic state 1 bit of the comparator 244. Its other input terminal receives the logic state 0 bit of the comparator 248. A shift register 256 stores the logic state 1 and 0 bit signals detected by comparators 244 and 248 via the OR gate 252, and a shift register 254 also stores the logic 1 and 0 bit signals detected by comparators 244 and 248. It also receives the signal from the output Q2 of latch 210 indicating whether or not bad samples are received for the bit currently analyzed. It is the contents of the registers 254, 256 that are transferred to the microprocessor 30 to be analyzed in accordance with the communications protocol and, in the first place, to implement an error correction code taking into account the state of Q2.

Figures 6A, 6B:
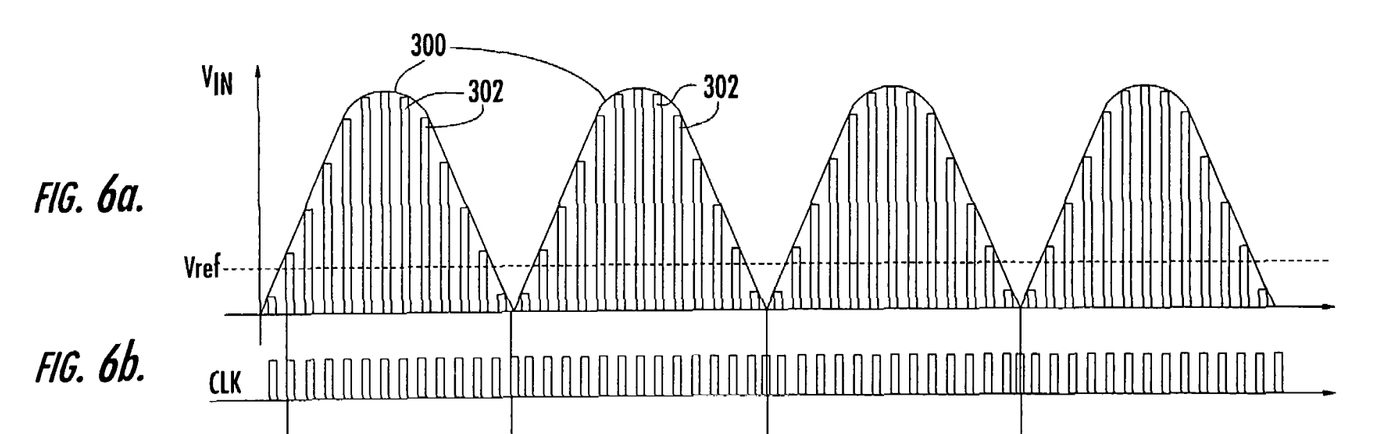
FIGS. 6a, 6b, and 6c are signal diagrams illustrating operation of the circuit of FIG. 5.

The operation of the demodulation circuit according to the diagram of FIG. 5 is as follows. The signal VIN, after translation and shaping in circuit 200, takes the form of the envelope 300 shown in the diagram of FIG. 6a. It is sampled in circuit 202 to obtain samples 302 in synchronization with the clock pulses CLK (FIG. 6b). The amplitude of each sample is encoded, and the corresponding code is compared in comparator 206 with a code that represents a reference voltage Vref.

Figure 6C:
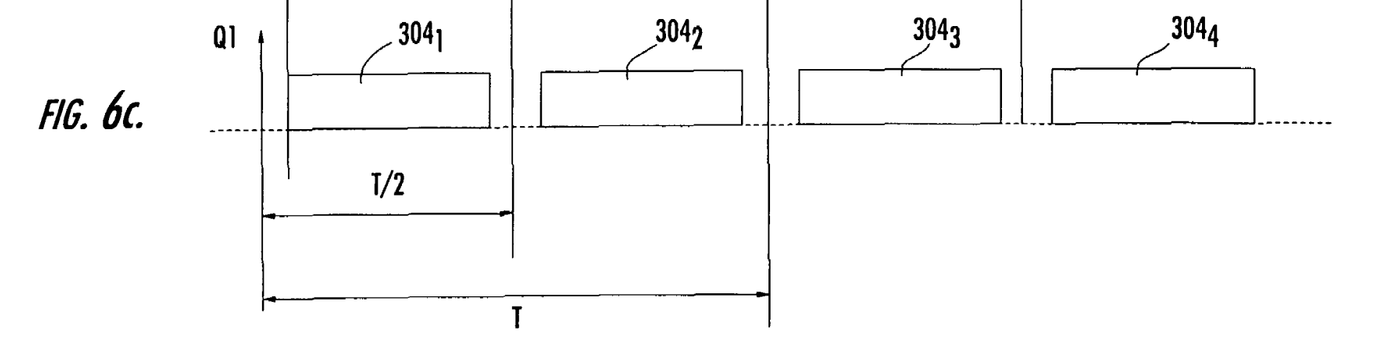

The latch 208 is in the logic state 1 while VIN>Vref, as shown in the diagram of FIG. 6c which illustrates the signal at the output terminal Q1 ($304_1$, $304_2$, $304_3$ and $304_4$). The intervals between signals $304_1$ to $304_4$ represent time periods during which VIN≦$V_{ref}$. When latch 208 is at logic state 1, the AND gate 212 is open and allows the passage of CLK pulses which are counted by counter 218. When the AND gate 212 is closed, the contents of counter 218 are compared in comparator 222 with the number P expected, it being known which channel is currently being received.

In the case where the signals are equal, the AND gate 216 is open so that the counter 242 is incremented by one unit to indicate that a sinusoid of the signal at the carrier frequency has been detected. This counter 242 is incremented by one unit each time a sinusoid of the signal at the carrier frequency is detected. Its content is compared to the value N indicating the presence of a bit at logic state 1 and to the value M indicating the presence of a bit at logic state 0 in respective comparators 244 and 248. Again, the values of N and M are supplied by the microprocessor 30 with knowledge of the channel currently being received. This comparison is carried out in the presence of a signal coming from the counter 258 and which indicates the position of the bit in the frame currently being received.

If the number of sinusoids is equal to N, then the bit is at logic state 1, while the bit is at logic state 0 if the number of sinusoids is equal to M. The bits 1 and 0 thus detected are stored in the shift register 254 for sending to the microprocessor 30. Provisions are made so that the comparisons performed allow a certain tolerance in the values of N and M.

The invention has been described as using several bandpass filters and several operational amplifiers. However, it is possible to use just one filter and just one operational amplifier using switched capacitor devices which allow a change in the operating frequency. Additionally, the operational amplifier can be connected between the multiplexer 26 and the device 28.

That which is claimed is:

1. A modulation/demodulation device capable of operating according to a plurality of modulation types each using a different carrier frequency and comprising:

a microprocessor for providing transmit digital information;

a modulator for modulating, according to a given modulation type from among the plurality of modulation types, a transmit signal at a given carrier frequency based upon a signal of a predetermined duration representative of the transmit digital information;

a sending/receiving device coupled to said modulator; and a demodulator coupled to said sending/receiving device and demodulating a received signal by determining a given type of modulation and given carrier frequency for the received signal, and analyzing the received signal based upon the given type of modulation to detect whether the received signal has the predetermined duration and supplying received digital information from the received signal to said microprocessor;

said demodulator comprising:

a plurality of bandpass filters each centered on a respective one of the carrier frequencies and filtering the received signal, a respective gain controllable operational amplifier coupled to each of said bandpass filters and providing an output, at least one comparator for comparing the output from each operational amplifier with a reference signal and providing a respective state signal for each output, and an encoding circuit for encoding the state signals to determine a modulation type of the received signal.

2. The modulation/demodulation device according to claim 1 wherein said modulator comprises a generator for generating the transmit signal at the given carrier frequency, and wherein said generator comprises:

a memory for storing R digital codes each representative of a sinusoid;

at least one address counter for scanning successive addresses of the R digital codes at a frequency;

a digital-to-analog converter (DAC) coupled to said memory for converting the R digital codes and supplying an analog signal at the carrier frequency; and a bandpass filter coupled to said DAC for passing the analog signal at the carrier frequency.

3. The modulation/demodulation device according to claim 2 wherein the frequency is equal to R times the carrier frequency.

4. The modulation/demodulation device according to claim 2 wherein said at least one address counter comprises two address counters for scanning successive addresses at different frequencies; and wherein said generator further comprises a routing circuit for routing addresses of the two address counters as a function of the transmit digital information.

5. The modulation/demodulation device according to claim 2 wherein said modulator comprises means for counting a number of cycles of said at least one address counter to determine the predetermined duration.

6. The modulation/demodulation device according to claim 2 wherein said modulator further comprises means for determining the frequency of scanning of said at least one address counter based upon the carrier frequency and the number R.

7. The modulation/demodulation device according to claim 1 further comprising a selection circuit for cooperating with said encoding circuit for selecting among the filtered received signals from said bandpass filters.

8. The modulation/demodulation device according to claim 1 wherein each gain controllable operational amplifier comprises:
  first, second and third comparators for comparing the filtered received signal input to said gain controllable operational amplifier to respective first, second, and third thresholds and supplying the state signals based upon the comparisons;
  a logic circuit for combining the state signals from said comparators and selectively delivering pulses based thereon;
  an up/down counter for receiving the pulses supplied by said logic circuit; and
  a network of switchable resistors coupled to said up/down converter and providing feedback to said first, second, and third comparators.

9. The modulation/demodulation device according to claim 8 wherein said up/down counter:
  increments contents thereof when the filtered received signal input to said gain controllable operational amplifier is greater than the second threshold but less than the first and third thresholds;
  decrements the contents thereof when the filtered received signal input to said gain controllable operational amplifier is greater than the first, second, and third thresholds; and
  does not modify the contents thereof when the filtered received signal input to said gain controllable operational amplifier is greater than the first and second thresholds but is less than the third threshold.

10. The modulation/demodulation device according to claim 8 wherein said up/down counter controls the network of switchable resistors to modify the feedback resistance.

11. The modulation/demodulation device according to claim 1 wherein said plurality of bandpass filters comprise switched capacitor type filter means.

12. The modulation/demodulation device according to claim 1 wherein said plurality of operational amplifiers comprise switched capacitor amplifier means.

13. The modulation/demodulation device according to claim 1 wherein said demodulator comprises:
  means for sampling each the received signal and encoding amplitudes of the samples into representative codes;
  means for counting the samples and determining a period of the signal;
  means for counting the number of periods of the received signal and determining whether the number of periods corresponds to a binary digit 1 or a binary digit 0; and
  means for recording a succession of binary digit 1's and binary digit 0's.

14. The modulation/demodulation device according to claim 13 wherein said means for sampling and encoding comprises:
  a translation circuit for translating and shaping the received signal;
  a sampling circuit for sampling the translated and shaped signal; and
  an analog-to-digital converter for converting the samples to the representative codes.

15. The modulation/demodulation device according to claim 13 wherein said means for counting the samples comprises:
  a first comparator for comparing the representative codes of the samples with a code representative of a threshold and supplying a state signal when the amplitude of the sample is greater than the threshold;
  a latch for storing the state signal supplied by said first comparator;
  a sample counting circuit for counting a number of the samples; and
  a second comparator for comparing the number of counted samples to an expected number of samples and supplying a validation signal when the number of counted samples and the expected number of samples are equal.

16. The modulation/demodulation device according to claim 13 wherein said means for counting the number of periods comprises:
  a counter for counting the number of periods of the received signal;
  a first comparator for comparing the counted number of periods to a number N of periods for a binary digit 1 and supplying a first validation signal if the counted number of periods and the number N are equal; and
  a second comparator for comparing the counted number of periods to a number M of periods for a binary digit 0 and supplying a second validation signal for the digit 0 if the counted number of periods and the number M are equal.

17. The modulation/demodulation device according to claim 1 wherein said sending/receiving device sends the transmit signal to a remote site, and wherein said demodulator receives the received signal from the remote site via said sending/receiving device.

18. A modulation/demodulation device comprising:
  a modulator for modulating, according to a given modulation type from among the plurality of modulation types each using a different carrier frequency, a transmit signal at a given carrier frequency based upon a signal of a predetermined duration representative of transmit digital information;
  a sending/receiving device coupled to said modulator; and
  a demodulator coupled to said sending/receiving device and demodulating a received signal by determining a given type of modulation and given carrier frequency for the received signal, and analyzing the received signal based upon the given type of modulation to detect whether the received signal has the predetermined duration and supplying received digital information from the received signal;
  said demodulator comprising:
    a plurality of bandpass filters each centered on a respective one of the carrier frequencies and filtering the received signal;
    a respective gain controllable operational amplifier coupled to each of said bandpass filters and providing an output;

at least one comparator for comparing the output from each operational amplifier with a reference signal and providing a respective state signal for each output; and an encoding circuit for encoding the state signals to determine a modulation type of the received signal.

19. The modulation/demodulation device according to claim 18 wherein said modulator comprises a generator for generating the transmit signal at the given carrier frequency, and wherein said generator comprises:

a memory for storing R digital codes each representative of a sinusoid;

at least one address counter for scanning successive addresses of the R digital codes at a frequency;

a digital-to-analog converter (DAC) coupled to said memory for converting the R digital codes and supplying an analog signal at the carrier frequency; and a bandpass filter coupled to said DAC for passing the analog signal at the carrier frequency.

20. The modulation/demodulation device according to claim 19 wherein the frequency is equal to R times the carrier frequency.

21. The modulation/demodulation device according to claim 19 wherein said at least one address counter comprises two address counters for scanning successive addresses at different frequencies; and wherein said generator further comprises a routing circuit for routing addresses of the two address counters as a function of the transmit digital information.

22. The modulation/demodulation device according to claim 19 wherein said modulator comprises means for counting a number of cycles of said at least one address counter to determine the predetermined duration.

23. The modulation/demodulation device according to claim 19 wherein said modulator further comprises means for determining the frequency of scanning of said at least one address counter based upon the carrier frequency and the number R.

24. The modulation/demodulation device according to claim 18 further comprising a selection circuit for cooperating with said encoding circuit for selecting among the filtered received signals from said bandpass filters.

25. The modulation/demodulation device according to claim 18 wherein each gain controllable operational amplifier comprises:

first, second and third comparators for comparing the filtered received signal input to said gain controllable operational amplifier to respective first, second, and third thresholds and supplying the state signals based upon the comparisons;

a logic circuit for combining the state signals from said comparators and selectively delivering pulses based thereon;

an up/down counter for receiving the pulses supplied by said logic circuit; and a network of switchable resistors coupled to said up/down converter and providing feedback to said first, second, and third comparators.

26. The modulation/demodulation device according to claim 25 wherein said up/down counter:

increments contents thereof when the filtered received signal input to said gain controllable operational amplifier is greater than the second threshold but less than the first and third thresholds;

decrements the contents thereof when the filtered received signal input to said gain controllable operational amplifier is greater than the first, second, and third thresholds; and does not modify the contents thereof when the filtered received signal input to said gain controllable operational amplifier is greater than the first and second thresholds but is less than the third threshold.

27. The modulation/demodulation device according to claim 25 wherein said up/down counter controls the network of switchable resistors to modify the feedback resistance.

28. The modulation/demodulation device according to claim 18 wherein said demodulator comprises:

means for sampling each the received signal and encoding amplitudes of the samples into representative codes;

means for counting the samples and determining a period of the signal;

means for counting the number of periods of the received signal and determining whether the number of periods corresponds to a binary digit 1 or a binary digit 0; and means for recording a succession of binary digit 1's and binary digit 0's.

29. The modulation/demodulation device according to claim 28 wherein said means for sampling and encoding comprises:

a translation circuit for translating and shaping the received signal;

a sampling circuit for sampling the translated and shaped signal; and an analog-to-digital converter for converting the samples to the representative codes.

30. The modulation/demodulation device according to claim 28 wherein said means for counting the samples comprises:

a first comparator for comparing the representative codes of the samples with a code representative of a threshold and supplying a state signal when the amplitude of the sample is greater than the threshold;

a latch for storing the state signal supplied by said first comparator;

a sample counting circuit f or counting a number of the samples; and a second comparator for comparing the number of counted samples to an expected number of samples and supplying a validation signal when the number of counted samples and the expected number of samples are equal.

31. The modulation/demodulation device according to claim 28 wherein said means for counting the number of periods comprises:

a counter for counting the number of periods of the received signal;

a first comparator for comparing the counted number of periods to a number N of periods for a binary digit 1 and supplying a first validation signal if the counted number of periods and the number N are equal; and a second comparator for comparing the counted number of periods to a number M of periods for a binary digit 0 and supplying a second validation signal for the digit 0 if the counted number of periods and the number M are equal.

32. The modulation/demodulation device according to claim 18 wherein said sending/receiving device sends the transmit signal to a remote site, and wherein said demodulator receives the received signal from the remote site via said sending/receiving device.

33. A method for modulating and demodulating a signal comprising:
    modulating, according to a given modulation type from among the plurality of modulation types each using a different carrier frequency, a transmit signal at a given carrier frequency based upon a signal of a predetermined duration representative of transmit digital information;
    sending the transmit signal to a remote site and receiving a received signal from the remote site
    demodulating the received signal by determining a given type of modulation and given carrier frequency for the received signal by:
        filtering the received signal using a plurality of bandpass filters each centered on a respective one of the carrier frequencies,
        amplifying the outputs of the bandpass filters,
        comparing each of the amplified outputs with a reference signal and providing a respective state signal therefor, and
        encoding the state signals to determine a modulation type of the received signal; and
        analyzing the received signal based upon the given type of modulation to detect whether the received signal has the predetermined duration and supply received digital information from the received signal.

34. The method according to claim 33 further comprising generating the transmit signal at the given carrier frequency by:
    storing R digital codes each representative of a sinusoid;
    scanning successive addresses of the R digital codes at a frequency;
    converting the R digital codes to an analog signal at the carrier frequency; and
    filtering the analog signal using a bandpass filter centered at the carrier frequency.

35. The method according to claim 34 wherein the frequency is equal to R times the carrier frequency.

* * * * *

UNITED STATES PATENT AND TRADEMARK OFFICE
CERTIFICATE OF CORRECTION

PATENT NO. : 7,061,985 B2  Page 1 of 1
APPLICATION NO. : 10/045956
DATED : June 13, 2006
INVENTOR(S) : Maurice Le Van Suu It is certified that error appears in the above-identified patent and that said Letters Patent is hereby corrected as shown below:

| | |
|---|---|
| Column 4, Line 50 | Delete: "Vrefmax"<br>Insert: -- Vrefmaxi -- |
| Column 9, Line 59 | Delete: "each the"<br>Insert: -- each of the -- |
| Column 12, Line 14 | Delete: "each the"<br>Insert: -- each of the -- |
| Column 12, Line 42 | Delete: "f or"<br>Insert: -- for -- |
| Column 13, Line 10 | Delete: "site"<br>Insert: --site; and -- |

Signed and Sealed this

Second Day of January, 2007

JON W. DUDAS
*Director of the United States Patent and Trademark Office*